United States Patent
Wang et al.

(10) Patent No.: US 9,277,167 B2
(45) Date of Patent: Mar. 1, 2016

(54) COMPENSATION DE-INTERLACING IMAGE PROCESSING APPARATUS AND ASSOCIATED METHOD

(75) Inventors: Yu-Jen Wang, Taipei (TW); Chung-Yi Chen, Nantou County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 790 days.

(21) Appl. No.: 13/337,453

(22) Filed: Dec. 27, 2011

(65) Prior Publication Data

US 2012/0170657 A1      Jul. 5, 2012

(30) Foreign Application Priority Data

Dec. 30, 2010   (TW) ................................ 99146972 A

(51) Int. Cl.
- *H04N 7/12* (2006.01)
- *H04N 11/02* (2006.01)
- *H04N 11/04* (2006.01)
- *H04N 7/01* (2006.01)

(52) U.S. Cl.
CPC ............. *H04N 7/012* (2013.01); *H04N 7/014* (2013.01)

(58) Field of Classification Search
CPC ................................ H04N 7/50; H04N 7/502
See application file for complete search history.

(56) References Cited

U.S. PATENT DOCUMENTS

| 6,122,017 | A  | * | 9/2000  | Taubman ....................... 348/620 |
| 2007/0206117 | A1 | * | 9/2007  | Tian et al. ....................... 348/452 |
| 2008/0259207 | A1 |   | 10/2008 | De Haan et al. |
| 2010/0039556 | A1 | * | 2/2010  | Au et al. ....................... 348/452 |

FOREIGN PATENT DOCUMENTS

| CN | 101189871 A | 5/2008 |
| CN | 101841719 A | 9/2010 |
| WO | 0174082 A1 | 10/2001 |

OTHER PUBLICATIONS

State Intellectual Property Office of the People's Republic of China, Office Action, Aug. 1, 2013.
Taiwan Intellectual Property Office, Office Action, Apr. 25, 2014.

* cited by examiner

*Primary Examiner* — Chikaodili E Anyikire
(74) *Attorney, Agent, or Firm* — WPAT, P.C.; Justin King; Douglas A. Hosack

(57) ABSTRACT

A motion compensation de-interlacing image processing apparatus is provided. The apparatus includes a motion compensation module, a still compensation module, a motion detection module, and a de-interlacing blending module. The motion compensation module generates a motion compensation pixel according to at least one of a current field, a previous field, and a next field of a target pixel to be interpolated. The still compensation module generates a still compensation pixel according to the previous field and the next field of the target pixel. The motion detection module determines a motion index according to the previous field and the next field of the target pixel. The de-interlacing blending module generates the target pixel by weighted averaging the motion compensation pixel and the still compensation pixel according to the motion index.

20 Claims, 9 Drawing Sheets

COMPENSATION DE-INTERLACING IMAGE PROCESSING APPARATUS AND ASSOCIATED METHOD

This application claims the benefit of Taiwan application Serial No. 99146972, filed Dec. 30, 2010, the subject matter of which is incorporated herein by reference.

BACKGROUND OF THE INVENTION

1. Field of the Invention

The invention relates in general to an image de-interlacing processing apparatus, and more particularly to a motion compensation de-interlacing image processing apparatus and associated method.

2. Description of the Related Art

Contributed by the digital television era, a television can not only receive television broadcasts and allow internet applications such as internet browsing, but a digital television is also able to offer video/audio quality and customization that far surpasses those of a conventional analog television. According to worldwide digital television specifications, television signal formats include progressive and interlaced scanning signal formats, which respectively have their advantages and disadvantages. Most significant advantages of the interlaced scanning signal formats include transmission data amount being relatively small while rendering better sharpness and contrast for dynamic images. Therefore, for situations requiring high-resolution and large-screen televisions and particularly with 1080 scan lines, interlaced scanning requiring less data transmission is more extensively applied to save transmission bandwidth.

Referring to FIG. 1, in interlaced scanning, each frame is divided into an odd field and an even field, with the odd field comprising only pixels of odd lines of the frame and the even field comprising only pixels of even lines of the frame. During transmission, the odd fields and the even fields are alternately transmitted such that the transmitted data amount within unit time is halved. However, image data received at an image receiving end is data of either odd fields or even fields rather than a complete frame, so that de-interlacing is needed to make up pixel data of the odd lines or even lines that are not transmitted to the receiving end at a same time point in order to generate a complete frame to be displayed on an image display apparatus. More specifically, an input odd field comprises only pixel data of $1^{st}$, $3^{rd}$, $5^{th}$, $7^{th}$, $9^{th}$ ... lines, and an input even field comprises only pixel data of $2^{nd}$, $4^{th}$, $6^{th}$, $8^{th}$, $10^{th}$ ... lines. Yet, it is necessary that an output image contain progressive frames that comprise pixel data of $1^{st}$, $2^{nd}$, $3^{rd}$, $4^{th}$, $5^{th}$, $6^{th}$, $7^{th}$, $8^{th}$, $9^{th}$, $10^{th}$ ... lines when outputting an image.

Common de-interlacing processing includes spatial de-interlacing and temporal de-interlacing. The spatial de-interlacing utilizes pixels having a same horizontal axis in previous and next lines in the field at a same time point for interpolating a target pixel to be interpolated, generally by interpolating with a pixel value obtained by averaging the previous and next pixels, or interpolating with a pixel value directly selected from either the previous or the next pixel. For example, consider a pixel A in an odd field Fn in FIG. 1 is a target pixel to be interpolated. With spatial de-interlacing, a pixel B at a previous line and a pixel C at a next line are averaged to obtain a pixel value for the pixel A, or one of the pixel B and the pixel C is directly selected as the pixel A. On the other hand, the temporal de-interlacing utilizes pixels at a same position in a previous field and a next field to interpolate a target pixel to be interpolated, by interpolating with a pixel value obtained by averaging the two pixels at a same position in the previous field and the next field. For example, consider again a pixel A in an odd field Fn in FIG. 1 is a target pixel to be interpolated. With temporal de-interlacing, a pixel D and a pixel E respectively at a same position in a previous odd field Fn−1 and a next field Fn+1 are averaged to obtain a pixel value for the pixel A. However, neither spatial de-interlacing nor temporal de-interlacing is capable of interpolating real pixels for dynamic images such that resulting image distortion is incurred. Therefore, the present invention utilizes estimation of motion vectors to accordingly interpolate real pixels to thereby enhance image quality.

SUMMARY OF THE INVENTION

The invention is directed to a motion compensation de-interlacing image processing apparatus and associated method for overcoming the abovementioned inadequacies associated with the prior art.

According to an aspect of the present invention, a motion compensation de-interlacing image processing apparatus is provided. The apparatus comprises a temporal motion compensation module, a spatial motion compensation module, and a motion compensation blending module. The temporal motion compensation module generates a temporal interpolation pixel and a temporal motion vector quality index according to a previous field and a next field of a target pixel to be interpolated. The spatial motion compensation module generates a spatial interpolation pixel and a jaggy index according to a current field of the target pixel. The motion compensation blending module generates the target pixel according to the temporal interpolation pixel, the spatial interpolation pixel, the temporal motion vector quality index, and the jaggy index.

According to an aspect of the present invention, a method for motion compensation de-interlacing image processing is provided. The method comprises steps of generating a temporal interpolation pixel and a temporal motion vector quality index according to a previous field and a next field of a target pixel to be interpolated; generating a spatial interpolation pixel and a jaggy index according to a current field of the target pixel; and generating the target pixel according to the temporal interpolation pixel, the spatial interpolation pixel, the temporal motion vector quality index, and the jaggy index.

According to an aspect of the present invention, a motion compensation de-interlacing image processing apparatus is provided. The apparatus comprises a motion compensation module, a still compensation module, a motion detection module, and a de-interlacing blending module. The motion compensation module generates a motion compensation pixel according to at least a current field, a previous field, and a next field of a target pixel to be interpolated. The still compensation module generates a still compensation pixel according to the previous field and the next field of the target pixel. The motion detection module determines a motion index according to the previous field and the next field of the target pixel. The de-interlacing blending module generates the target pixel by weight averaging the motion compensation pixel and the still compensation pixel according to the motion index.

According to an aspect of the present invention, a method for motion compensation de-interlacing image processing is provided. The method comprises steps of generating a motion compensation pixel according to at least a current field, a previous field, and a next field of a target pixel to be interpolated; generating a still compensation pixel according to the previous field and the next field of the target pixel; determining a motion index according to the previous field and the next field of the target pixel; and generating the target pixel by weight averaging the motion compensation pixel and the still compensation pixel according to the motion index.

According to an aspect of the present invention, a motion compensation de-interlacing image processing apparatus is provided. The apparatus comprises a temporal motion compensation module, for generating a temporal interpolation pixel and a temporal motion vector quality index according to a previous field and a next field of a target pixel to be interpolated; a spatial motion compensation module, for generating a spatial interpolation pixel according to a current field the target pixel; and a motion compensation blending module, for generating the target pixel according to the temporal interpolation pixel, the spatial interpolation pixel, and the temporal motion vector quality index.

According to an aspect of the present invention, a motion compensation de-interlacing image processing apparatus is provided. The apparatus comprises a temporal motion compensation module, for generating a temporal interpolation pixel according to a previous field and a next field of a target pixel to be interpolated; a spatial motion compensation module, for generating a spatial interpolation pixel and a jaggy index according to a current field the target pixel; and a motion compensation blending module, for generating the target pixel according to the temporal interpolation pixel, the spatial interpolation pixel and the jaggy index.

Therefore, the present invention utilizes estimation of motion vectors to accordingly interpolate real pixels to thereby enhance image quality.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
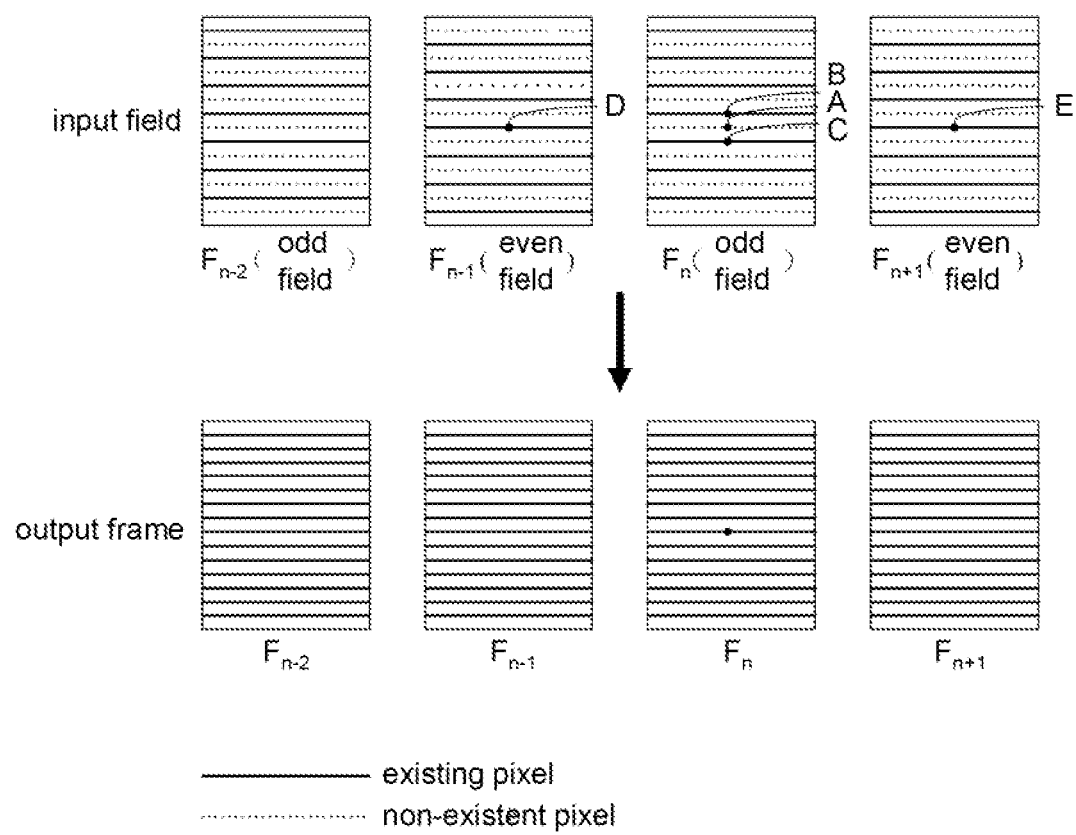
FIG. 1 is a schematic diagram of a de-interlacing image processing.
Figure 2:
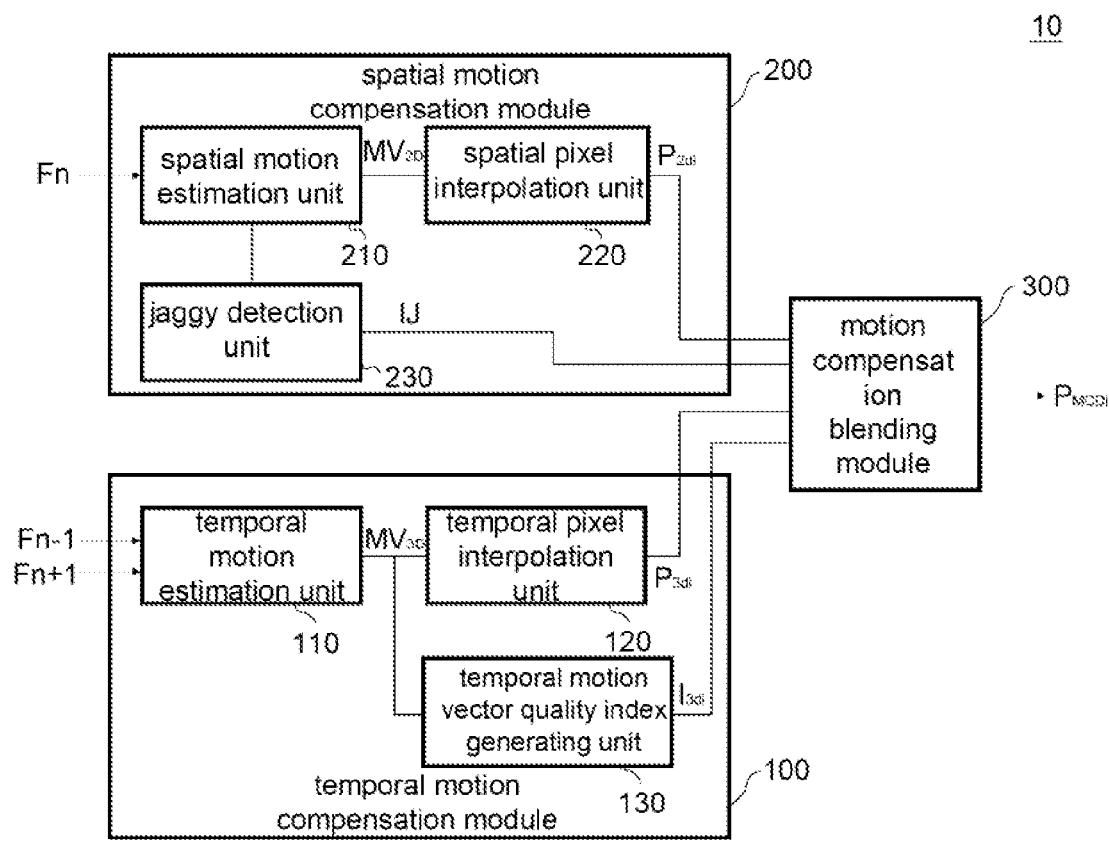
FIG. 2 is a functional block diagram of a motion compensation de-interlacing image processing apparatus according to a preferred embodiment of the present invention.
Figure 3:
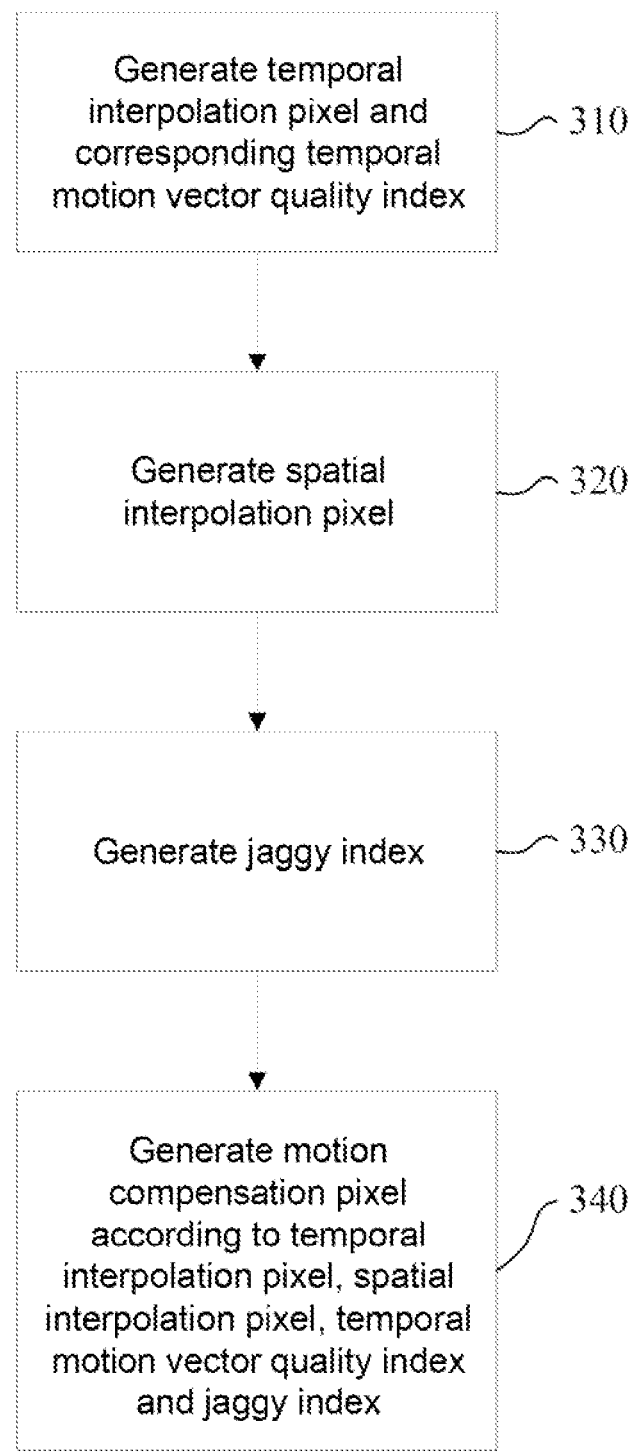
FIG. 3 is a flowchart of a method for motion compensation de-interlacing image processing according to a preferred embodiment of the present invention.

FIG. 2 shows a functional block diagram of a motion compensation de-interlacing image processing apparatus 10 according to a preferred embodiment of the present invention. The de-interlacing image processing apparatus 10 converts fields of interlaced scanning to fields of progressive scanning; that is, a complete frame is restored by interpolating pixels of missing even lines or missing odd lines respectively in odd fields or even fields. The de-interlacing image processing apparatus 10 comprises a temporal motion compensation module 100, a spatial motion compensation module 200, and a motion compensation blending module 300. The temporal motion compensation module 100 comprises a temporal motion estimation unit 110, a temporal pixel interpolation unit 120, and a temporal motion vector quality index generating unit 130. The spatial motion compensation module 200 comprises a spatial motion estimation unit 210, a spatial pixel interpolation unit 220, and a jaggy detection unit 230. To better understand operations of the present invention, the description below is given also with reference to FIG. 3 illustrating a flowchart of a method for motion compensation de-interlacing image processing according to a preferred embodiment of the present invention. In Step 310, the temporal motion compensation module 100 generates a temporal interpolation pixel P3$di$ in a current field Fn and a corresponding temporal motion vector quality index I3$di$ according to a previous field Fn−1 and a next field Fn+1 of the current field Fn. In Steps 320 and 330, the spatial motion compensation module 200 generates a spatial interpolation pixel P2$di$ in a line Ln (i.e., a target line to be compensated) and a corresponding jaggy index Ij according to a previous line Ln−1 and a next line Ln+1 of the line Ln. In Step 340, the motion compensation blending module 300 generates a motion compensation pixel PMCDi according to the temporal interpolation pixel P3$di$, the spatial interpolation pixel P2$di$, the temporal motion vector quality index I3$di$ and the jaggy index Ij.

Figure 4:
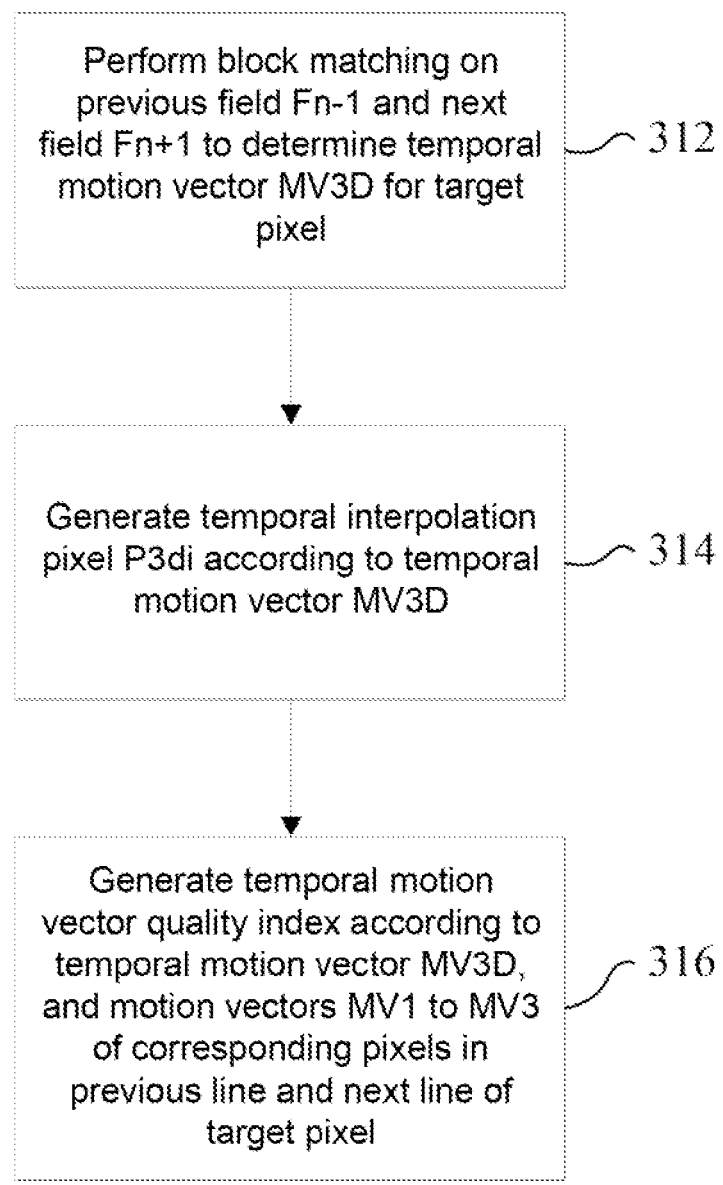
FIG. 4 is a flowchart of operations of a temporal motion compensation module.
Figure 5A:
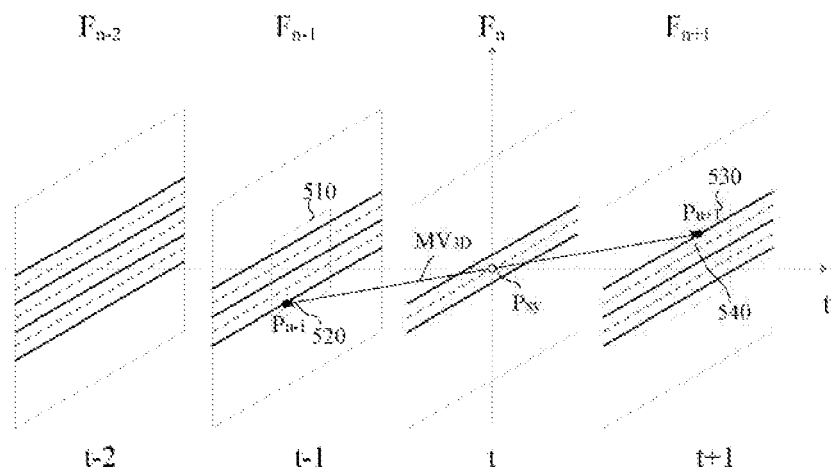
FIG. 5A is a schematic diagram for determining a temporal motion vector.

FIG. 4 shows a flowchart of operations of the temporal motion compensation module 100. In Step 312, the temporal motion estimation unit 100 determines a temporal motion vector MV3D by performing block matching on the previous field Fn−1 and the next field Fn+1 of a target pixel Pxy to be interpolated. Also refer to FIG. 5A showing a schematic diagram for determining a temporal motion vector. When the pixel in the current field Fn is a target pixel to be interpolated, blocks 520 and 540 are regarded as a block matching unit size, and regions 510 and 530 are regarded as a block matching region. To determine the temporal motion vector of the pixel Pxy, block matching is performed based on a unit size as the blocks 520 and 540 within the regions 510 and 530. For the temporal motion vector estimation, most approximate blocks respectively from the previous field Fn−1 and the next field Fn+1 are determined, with a search range being either the entire fields or partial of the fields. Taking an algorithm amount into consideration, sum of absolute difference (SAD) is adopted for block matching in a preferred embodiment of the invention. More specifically, when a sum of absolute difference between two blocks is smallest, the two blocks are determined as to be most approximate, and a corresponding vector derived therefrom is the temporal motion vector of the pixel Pxy. The SAD is calculated as:

$$SAD(i, j) = \sum_{k=0}^{N-1}\sum_{l=0}^{N-1} |C(x+k, y+l) - R(x+i+k, y+j+l)|$$

$$-p \le i, j \le p$$

The motion vector is (m,n), so the SAD is the smallest when i=m, j=n, where
1) N is a length and a width of the blocks;
2) C(x+y, y+1) is a point in a target image block in a target image field;
3) R(x+1+k, y+j+1) is a point in a reference image block in a reference image field; and
4) p is a search range.

In a preferred embodiment of the present invention, in order to reduce complications and costs, the blocks 520 and 540 are 1*5 one-dimensional blocks, and the regions 510 and 530 are 5*10 regions. Supposing a comparison results show that the SAD between the block 520 in the previous field Fn−1 and the block 540 in the next field Fn+1 is the smallest, it means that the motion vector MV3D is the temporal motion vector of the pixel Pxy. It is to be noted that, sizes of the blocks 520 and 540 and the regions 510 and 530 are determined according to actual requirements and are not to be limited by the sizes taken as examples above.

In Step 314, the temporal pixel interpolation unit 120 first identifies a pixel Pn−1 in the previous field Fn−1 and a pixel Pn+1 in the next field Fn+1 according to the temporal motion vector MV3D, and accordingly generates a temporal interpolation pixel P3*di* for the pixel Pxy. For example, the temporal interpolation pixel P3*di* is selected from one of the pixels Pn−1 and Pn+1, or is a pixel value obtained by weight averaging the pixels Pn−1 and Pn+1.

Figure 5B:
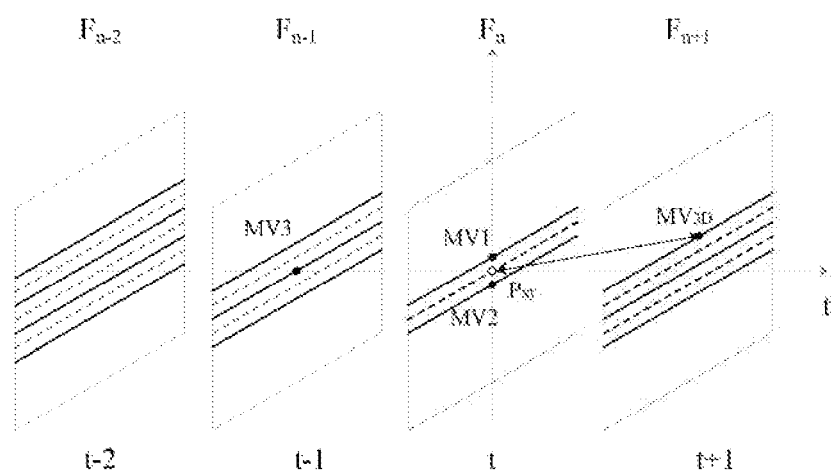
FIG. 5B is a schematic diagram for determining a temporal motion vector quality index.

FIG. 5B shows a schematic diagram for determining a temporal motion vector quality index. In Step 316, according to the temporal motion vector MV3D of the target pixel Pxy as well as motion vectors MV1 to MV3 respectively of the previous line, the next line and the previous field, the temporal motion vector quality index generating unit 130 generates a temporal motion vector quality index I3*di*, which is then provided to the motion compensation blending module 300 for determining a reliability of the temporal interpolation pixel P3*di*. In a preferred embodiment of the invention, the temporal motion vector quality index I3*di* is determined as:

I3*di*=|MV3D−MV1|+|MV3D−MV2|+|MV3D−MV3|

In another preferred embodiment of the invention, the temporal motion vector quality index I3*di* is determined as:

I3*di*=Max(|MV3D−MV1|,|MV3D−MV2|,|MV3D−MV3|)

As the temporal motion vector quality index I3*di* decreases, it means that the temporal motion vector MV3D of the target pixel Pxy approximates motion vectors of nearby areas and the previous field; that is, motion tendencies are similar so that reliabilities of the temporal motion vector MV3D and the temporal interpolation pixel P3*di* are high. Conversely, the temporal motion vector quality index I3*di* increases, it means that the temporal motion vector MV3D of the target pixel Pxy differs from motion vectors of nearby areas and the previous field; that is, motion tendencies are different so that reliabilities of the temporal motion vector MV3D and the temporal interpolation pixel P3*di* are low.

Figure 6:
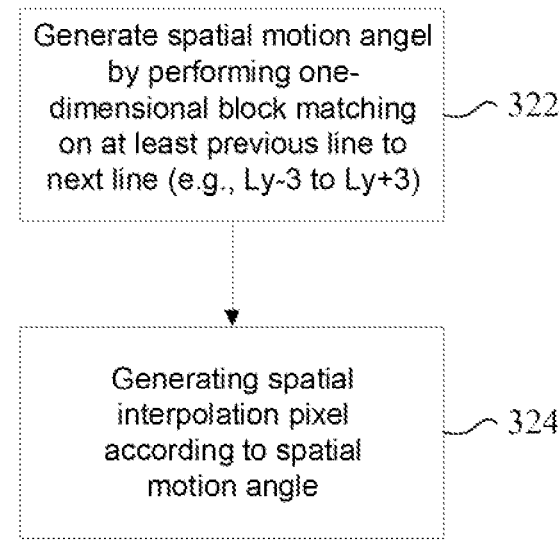
FIG. 6 is a flowchart for generating a spatial compensation pixel.
Figure 8:
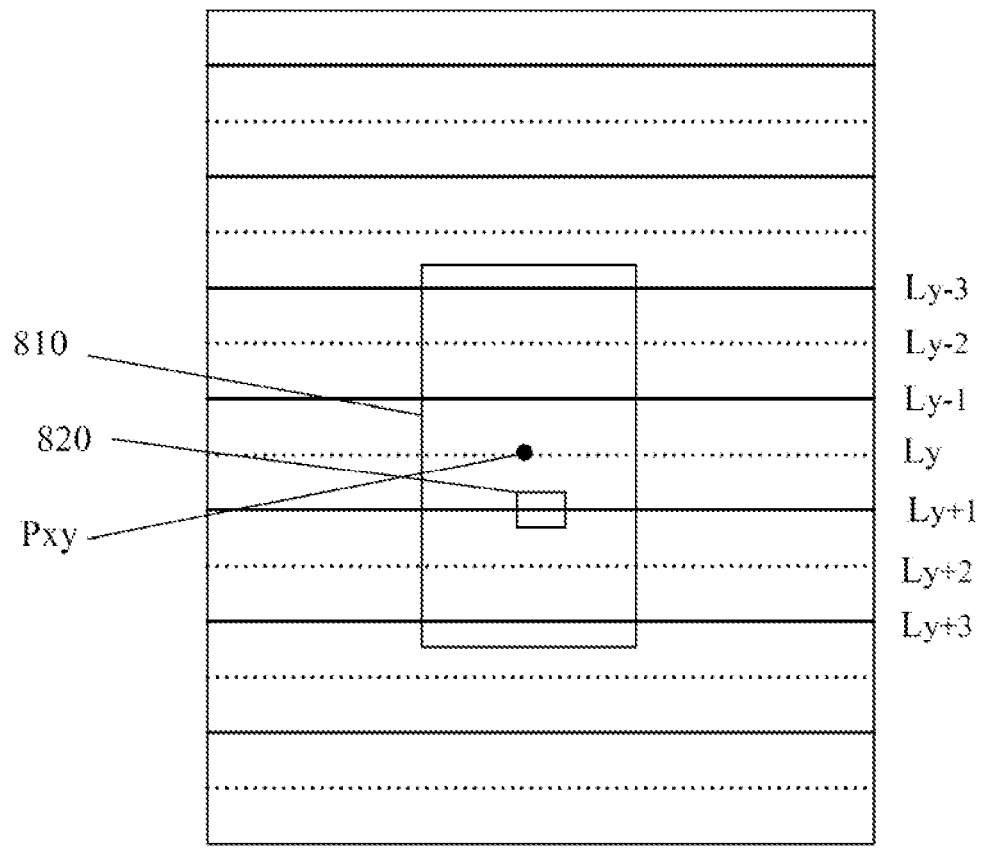
FIG. 8 is a schematic diagram for block matching when implementing a method for image processing of the present invention.

Spatial motion compensation is to be performed next. FIG. 6 shows a flowchart for generating a spatial compensation pixel. In Step 322, the spatial motion estimation unit 210 performs block matching on at least the previous line and the next line of the target pixel Pxy in the current field Fn to generate a spatial motion angle; in a preferred embodiment of the present invention, block matching is performed between lines Ly−3 and Ly+3. Also with reference to FIG. 8, the Pxy is a target pixel to be interpolated, a block 820 is a block matching unit size, and a region 810 is a block matching region. In a preferred embodiment of the present invention, to reduce complications and costs, the block 820 is a 1*5 one-dimensional block, and the region 810 is a 7*10 region (between Ly−3 and Ly+3). Further, sum of absolute difference (SAD) is adopted in block matching, meaning that the spatial motion angle of the target pixel Pxy is determined by two blocks with a smallest SAD according to the previous line Ln−1 and the next line Ln+1. It is to be noted that, the sizes of the block 820 and the region 810 are determined according to actual requirements and are not to be limited by the sizes taken as examples above. In Step 324, the spatial pixel interpolation unit 220 identifies two corresponding pixels in the previous line Ln−1 and the next line Ln+1 according to the spatial motion angle of the target pixel Pxy, and then generates a spatial interpolation pixel P2*di* for the target pixel Pxy. For example, the spatial interpolation pixel P2*di* is selected from one of the two corresponding pixels, or is a pixel value obtained by weight averaging the two corresponding pixels.

Figure 7:
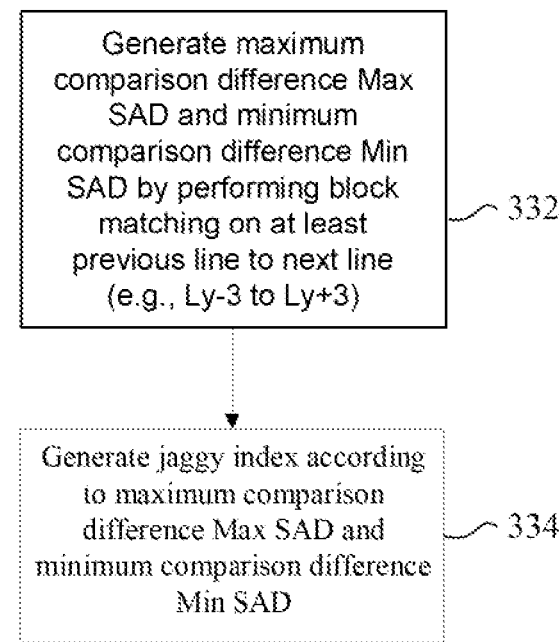
FIG. 7 is a flowchart for determining a jaggy index.

FIG. 7 shows a flowchart for determining a jaggy index. In Step 332, during block matching, the spatial motion estimation unit 210 generates a maximum comparison difference Max SAD and a minimum comparison difference Min SAD. The jaggy detection unit 230 then generates a jaggy index Ij according to the maximum comparison difference Max SAD and the minimum comparison difference Min SAD, and the jaggy index Ij is provided to the motion compensation blending module 300 to determine a reliability of the spatial interpolation pixel P2*di*. In a preferred embodiment of the present invention, the jaggy index Ij is determined as:

Ij=Max SAD−Min SAD

As the jaggy index Ij decreases, it implies that the previous line Ln−1 and the next line Ln+1 of the target pixel Pxy are not located at an edge, so that the reliability of the spatial motion interpolation pixel P2*di* is high. Conversely, as the jaggy index Ij increases, it implies that the previous line Ln−1 and the next line Ln+1 of the target pixel Pxy are located at an edge, so that the reliability of the spatial motion interpolation pixel P2*di* is low.

In Step 340, the motion compensation blending unit 300 generates a motion compensation pixel PMCDi for the target pixel Pxy according to the temporal interpolation pixel P3*di*, the spatial interpolation pixel P2*di*, the temporal motion vector quality index I3*di* and the jaggy index Ij. According to the temporal motion vector quality index I3*di* and the jaggy index Ij, the motion compensation blending module 300 selects either the temporal interpolation pixel P3*di* or the spatial interpolation pixel P2*di* as the motion compensation pixel PMCDi. Alternatively, a weight value α is determined according to the temporal motion vector quality index I3*di* and the jaggy index Ij, and the temporal interpolation pixel P3*di* and the spatial interpolation pixel P2*di* are weighted averaged according to the weight value α to generate the motion compensation pixel PMCDi. In a preferred embodiment of the present invention, the motion compensation pixel PMCDi is determined according to the latter method, as:

PMCDi=αP3*di*+(1−α)*P2*di*, where, α=*f*(I3*di*,Ij)=min max (a*I3*di*−b*Ij, 0, 1).

With the embodiments, it is described that the motion compensation de-interlacing image processing apparatus and method generates a pixel value of a target pixel to be interpolated by taking influences of a dynamic image. However, even better compensation effects can be rendered when a still compensation mechanism is also implemented for situations involving a still image.

Figure 9:
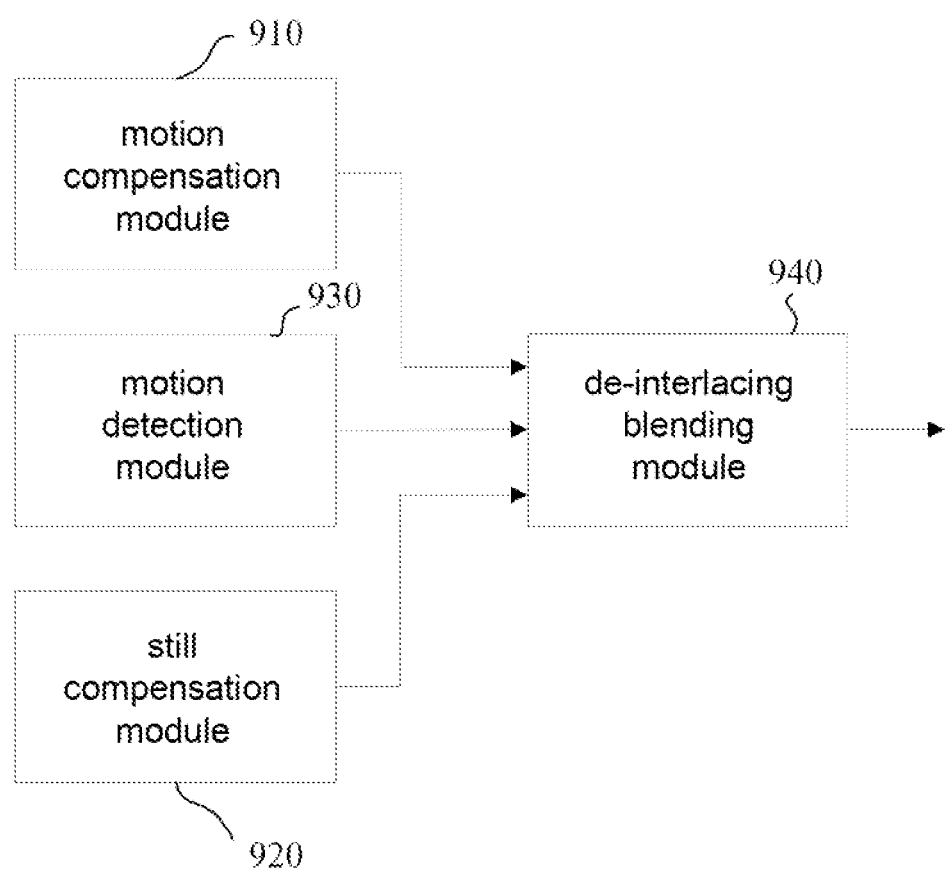
FIG. 9 is a functional block diagram of a motion compensation de-interlacing image processing apparatus according to another preferred embodiment of the present invention.
Figure 10:
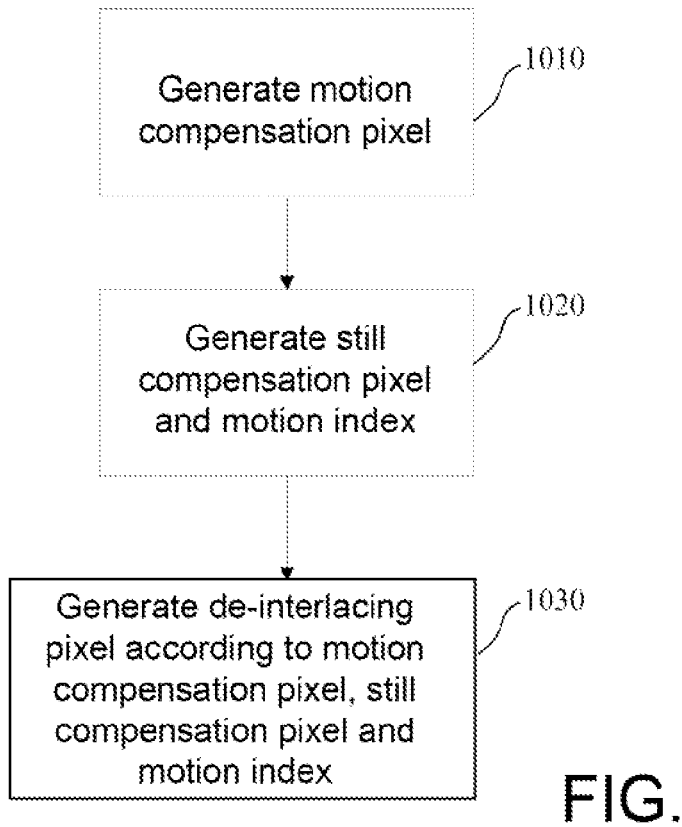
FIG. 10 is a flowchart of a method for motion compensation de-interlacing image processing according to another preferred embodiment of the present invention.

FIG. 9 shows a functional block diagram of a motion compensation de-interlacing image processing apparatus 90 according to a preferred embodiment of the present invention. The de-interlacing image processing apparatus 90 converts fields of interlaced scanning to fields of progressive scanning; that is, a complete frame is restored by interpolating pixels of missing even lines or missing odd lines respectively in odd fields or even fields. The de-interlacing image processing apparatus 90 comprises a motion compensation module 910, a still compensation module 920, a motion detection module 930, and a de-interlacing blending module 940. To better understand the present invention, the description below is given with reference to FIG. 10 showing a flowchart of a method for motion compensation de-interlacing image processing according to another preferred embodiment of the present invention. In Step 1010, the motion compensation module 910 generates a motion compensation pixel PMCDi by implementing a motion compensation method that takes all temporal and spatial motion factors into consideration. For example, the motion compensation pixel PMCDi is generated by the apparatus and method illustrated in FIGS. 2 and 3. In Step 1020, the still compensation module 920 and the motion detection module 930 respectively generate a still compensation pixel PSCDi and a motion index Im. In Step 1030, the de-interlacing blending module 940 generates a de-interlacing pixel PDi according to the motion compensation pixel PMCDi, the still compensation pixel PSCDi and the motion index Im.

Figure 11:
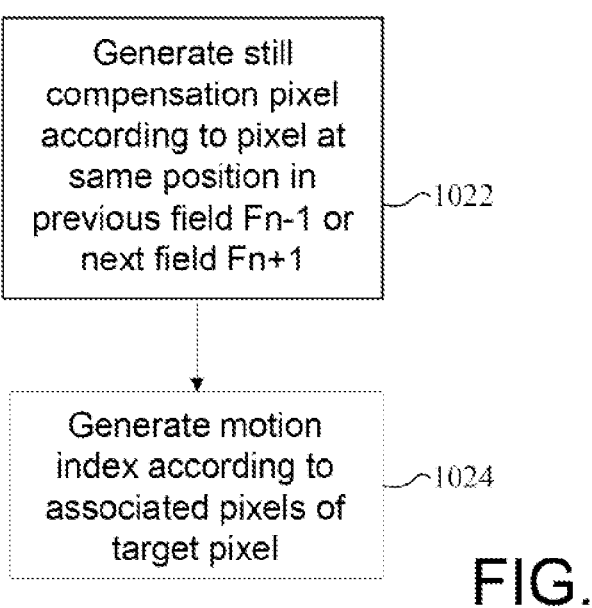
FIG. 11 is a flowchart for generating a still compensation pixel and a motion index.

FIG. 11 shows a detailed flowchart for generating a still compensation pixel PSCDi and a motion index Im. Referring to FIG. 11, in Step 1022, the still compensation module 920 selects a pixel at a same position in the previous field Fn−1 or the next field Fn+1 of the target pixel Pxy to be compensated as the still compensation pixel PSCDi. Alternatively, an average of pixel values of the pixels at a same position in the previous field Fn−1 and the next field Fn+1 of the target pixel Pxy is calculated as the still compensation pixel PSCDi. In Step 1024, the motion detection module 930 determines the motion index Im according to associated pixels of the target pixel Pxy. In a preferred embodiment of the present invention, a difference between pixels at a same position in the previous field Fn−1 and the next field Fn+1 of the target pixel Pxy is calculated as the motion index Im, as:

$Im=|Pn-1-Pn+1|$

In another preferred embodiment of the present invention, a motion index of associated pixels in at least a surrounding, previous, and next field of the target pixel Pxy is first obtained to calculate the motion index Im. In such embodiment, the associated pixels are surrounding pixels ((Pxy−1,n), (Px−1y−1,n), (Px+1y−1,n), (Pxy+1,n), (Px−1y+1,n), (Px+1y_1,n)) at a same horizontal position in the previous line and the next line, and surrounding pixels ((Pxy,n−1), (Px−1y,n−1), (Px+1y,n−1), (Pxy,n+1), (Px−1y,n+1), (Px+1 y,n+1)) in the previous field and the next field, of the target pixel Pxy, calculated as:

$Ixy,n=\beta*Ixy,n-2+(1-\beta)*|Pxy,n-1-Pxy,n+1|$ $Im,xy,n=avg(Ixy-1,n,Ix-1y-1,n,Ix+1y-1,n,Ixy+1,n,Ix-1y+1,n,Ix+1y+1,n,Ixy,n-1,Ix-1y,n-1,Ix+1y,n,Ixy,n+1,Ix-1y,n+1,Ix+1y,n+1)$ As the motion index Im decreases, the greater the probability that the target pixel is located at a still region in consecutive images is, so the reliability of the still compensation pixel PSCDi is high. Conversely, as motion index Im increases, the greater the probability that the target pixel is located at a dynamic region in consecutive images is, so that reliability of the still compensation pixel PSCDi is low.

Further, in a preferred embodiment of the present invention, to determine the de-interlacing pixel, the de-interlacing blending module 940 also determines a weight value according to the motion index Im, and then weighted averages the motion compensation pixel PMCDi and the still compensation pixel PSCDi to generate the de-interlacing pixel PDi, as:

$PDi=\gamma*PMCDi+(1-\gamma)*PSCDi$, where $\gamma=f(Im)$.

For example, the de-interlacing blending module 940 may select either the motion compensation pixel PMCDi or the still compensation pixel PSCDi as the de-interlacing pixel PDi. It is to be understood that the two embodiments for determining the de-interlacing pixel are illustrative of the present invention but are not to be construed as limiting.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A motion compensation de-interlacing image processing apparatus, comprising:
   a temporal motion compensation module, for generating a temporal interpolation pixel and a temporal motion vector quality index according to a previous field and a next field associated with a target pixel to be interpolated;
   a spatial motion compensation module, for generating a spatial interpolation pixel and a jaggy index according to a current field associated with the target pixel; and
   a motion compensation blending module, for generating the target pixel according to the temporal interpolation pixel, the spatial interpolation pixel, the temporal motion vector quality index and the jaggy index.

2. The apparatus according to claim 1, wherein the temporal motion compensation module comprises:
   a temporal motion estimation unit, for determining a temporal motion vector by performing block matching on the previous field and the next field of the target pixel;
   a temporal pixel interpolation unit, for performing an interpolation calculation on the previous field and the next field according to the temporal motion vector to generate the temporal interpolation pixel; and
   a temporal motion vector quality index generating unit, for generating a temporal motion vector quality index according to the temporal motion vector and a motion vector of at least one associated pixel of the target pixel.

3. The apparatus according to claim 2, wherein the temporal motion estimation unit performs block matching with a one-dimensional unit size within a predetermined region in the previous field and the next field, and determines a most approximate motion vector from the block matching result as the temporal motion vector.

4. The apparatus according to claim 2, wherein temporal pixel interpolation unit respectively obtains a first pixel and a second pixel from the previous field and the next field according to the temporal motion vector, and generates the temporal interpolation pixel by averaging the first pixel and the second pixel.

5. The apparatus according to claim 2, wherein the temporal motion vector quality index generating unit generates the temporal motion vector quality index by comparing motion vectors of corresponding pixels in a previous line, a next line, and the previous field of the target pixel according to the temporal motion vector.

6. The apparatus according to claim 1, wherein the spatial motion compensation module comprises:
 a spatial motion estimation unit, for generating a plurality of comparison differences and a spatial motion angle by performing one-dimensional block matching within a predetermined region including at least a previous line and a next line of the target pixel;
 a spatial pixel interpolation unit, for generating the spatial interpolation pixel by performing an interpolation calculation on the predetermined region according to the spatial motion angle; and
 a jaggy detection unit, for generating the jaggy index according to the plurality of comparison differences.

7. A method for motion compensation de-interlacing image processing, comprising steps of:
 generating a temporal interpolation pixel and a temporal motion vector quality index according to a previous field and a next field associated with a target pixel to be interpolated;
 generating a spatial interpolation pixel and jaggy index according to a current field associated with the target pixel; and
 generating the target pixel according to the temporal interpolation pixel, the spatial interpolation pixel, the temporal motion vector quality index and the jaggy index.

8. The method according to claim 7, wherein the step of generating the temporal interpolation pixel and the temporal motion vector quality index further comprises determining a temporal motion vector by performing block matching on the previous field and the next field of the target pixel.

9. The method according to claim 8, wherein the temporal interpolation pixel is generated by performing an interpolation calculation on the previous field and the next field according to the temporal motion vector, and the temporal motion vector quality index is generated according to the temporal motion vector and a motion vector of at least one associated pixel of the target pixel.

10. The method according to claim 8, wherein the temporal motion vector is a most approximate motion vector obtained from performing block matching with a one-dimensional unit size within a predetermined region in the previous field and the next field.

11. The method according to claim 8, wherein the temporal interpolation pixel is generated by averaging a first pixel and a second pixel respectively obtained from the previous field and the next field according to the temporal motion vector.

12. The method according to claim 8, wherein the temporal motion vector quality index is generated from comparing the temporal motion vector with motion vectors of corresponding pixels in a previous line, a next line, and the previous field of the target pixel.

13. A motion compensation de-interlacing image processing apparatus, comprising:
 a motion compensation module, for generating a motion compensation pixel according to a current field, a previous field and a next field associated with a target pixel to be interpolated;
 a still compensation module, for generating a still compensation pixel according to the previous field and the next field associated with the target pixel;
 a motion detection module, for generating a motion index according to associated pixels of the target pixel; and
 a de-interlacing blending module, for generating the target pixel by weighted averaging the motion compensation pixel and the still compensation pixel according to the motion index.

14. The apparatus according to claim 13, wherein the motion compensation module comprises:
 a temporal motion compensation module, for generating a temporal interpolation pixel and a temporal motion vector quality index according to the previous field and the next field of the target pixel;
 a spatial motion compensation module, for generating a spatial interpolation pixel and a jaggy index according to the current field of the target pixel; and
 a motion compensation blending module, for generating the motion compensation pixel according to the temporal interpolation pixel, the spatial interpolation pixel, the temporal motion vector quality index, and the jaggy index.

15. A method for motion compensation de-interlacing image processing, comprising steps of:
 generating a motion compensation pixel according to a current field, a previous field and a next field associated with a target pixel to be interpolated;
 generating a still compensation pixel according to the previous field and the next field associated with the target pixel;
 determining a motion index according to associated pixels of the target pixel; and
 generating the target pixel by weighted averaging the motion compensation pixel and the still compensation pixel.

16. The method according to claim 15, wherein the step of generating the motion compensation pixel further comprises:
 generating a temporal interpolation pixel and a temporal motion vector quality index according to the previous field and the next field of the target pixel;
 generating a spatial interpolation pixel and a jaggy index according to the current field of the target pixel; and
 generating the motion compensation pixel according to the temporal interpolation pixel, the spatial interpolation pixel, the temporal motion vector quality index, and the jaggy index.

17. A motion compensation de-interlacing image processing apparatus, comprising:
 a temporal motion compensation module, for generating a temporal interpolation pixel and a temporal motion vector quality index according to a previous field and a next field associated with a target pixel to be interpolated;
 a spatial motion compensation module, for generating a spatial interpolation pixel according to a current field associated with the target pixel; and
 a motion compensation blending module, for generating the target pixel according to the temporal interpolation pixel, the spatial interpolation pixel, and the temporal motion vector quality index.

18. The apparatus according to claim 17, wherein the temporal motion compensation module comprises:
 a temporal motion estimation unit, for determining a temporal motion vector by performing block matching on the previous field and the next field of 5 the target pixel;
 a temporal pixel interpolation unit, for generating the temporal interpolation pixel by performing an interpolation calculation on the previous field and the next field according to the temporal motion vector; and a temporal motion vector quality index generating unit, for generating a temporal motion vector quality index according to the temporal motion vector and a motion vector of at least one associated pixel of the target pixel.

19. A motion compensation de-interlacing image processing apparatus, comprising:

a temporal motion compensation module, for generating a temporal interpolation pixel according to a previous field and a next field associated with a target pixel to be interpolated;

a spatial motion compensation module, for generating a spatial interpolation pixel and a jaggy index according to a current field of the target pixel; and a motion compensation blending module, for generating the target pixel according to the temporal interpolation pixel, the spatial interpolation pixel and the jaggy index.

20. The apparatus according to claim 19, wherein the temporal motion compensation module comprises:

a temporal motion estimation unit, for determining a temporal motion vector by performing block matching on the previous field and the next field of the target pixel;

a temporal pixel interpolation unit, for generating the temporal interpolation pixel by performing an interpolation calculation on the previous field and the next field according to the temporal motion vector.

* * * * *